United States Patent [19]
Conrad

[11] Patent Number: 5,147,614
[45] Date of Patent: Sep. 15, 1992

[54] SELF-CONTAINED TUBULAR CORONA CELL FOR GENERATING OZONE

[76] Inventor: Richard H. Conrad, 950 Idylberry Rd., San Rafael, Calif. 94903

[21] Appl. No.: 515,440

[22] Filed: Apr. 27, 1990

[51] Int. Cl.$^5$ .......................... B01J 19/08; B01J 19/12
[52] U.S. Cl. .................................. 422/186.18; 422/22; 422/186.3
[58] Field of Search .............. 422/186, 186.07, 186.18, 422/186.04, 186.11, 186.19, 186.2, 186.21, 186.22, 22

[56] References Cited

U.S. PATENT DOCUMENTS

| | | | |
|---|---|---|---|
| 1,577,747 | 3/1926 | Hartman | 422/186.19 |
| 2,822,327 | 2/1958 | Hammesfahr et al. | 204/176 |
| 3,730,874 | 5/1973 | Trub | 422/186.15 |
| 3,766,051 | 10/1973 | Bollyky | 204/321 |
| 4,410,495 | 10/1983 | Bassler et al. | 422/186.18 |
| 4,954,320 | 9/1990 | Birmingham et al. | 422/186.04 |
| 5,002,738 | 3/1991 | Pin et al. | 422/186.13 |
| 5,002,739 | 3/1991 | Ditzler et al. | 422/186.19 |

Primary Examiner—Brooks H. Hunt
Assistant Examiner—Daniel J. Jenkins
Attorney, Agent, or Firm—Larry D. Johnson

[57] ABSTRACT

A self-contained and self-supporting cell for generating ozone by corona discharge which consists basically of two open-ended straight tubes. An inner metal tube serves as a first electrode and is cooled by a fluid flowing through its core. An outer glass or ceramic tube concentrically surrounds and is shorter than the inner tube, carries a second electrode on its outer surface, and is cooled by a flow of fluid across its outer surface. The inner metal tube serves as a supporting column on which all other components are mounted and aligned. It carries a collar near each of its ends, and across each collar are clamped outer end-pieces carrying coolant seals and fittings, the inner side of the clamp assembly comprising flat aligning plates. Short cylinders of non-conductive inert material, bearing seals on each face and dry gas inlet/ozone outlet ports, fit concentrically around the inner tube and are clamped between the surfaces of clamping-plates. The ends of the dielectric tube fit inside sealing rings in the inner faces of the short cylinders. The invention also includes an extension coupling which allows the mounting of two or more dielectric tubes in series on a single metal tube.

12 Claims, 9 Drawing Sheets

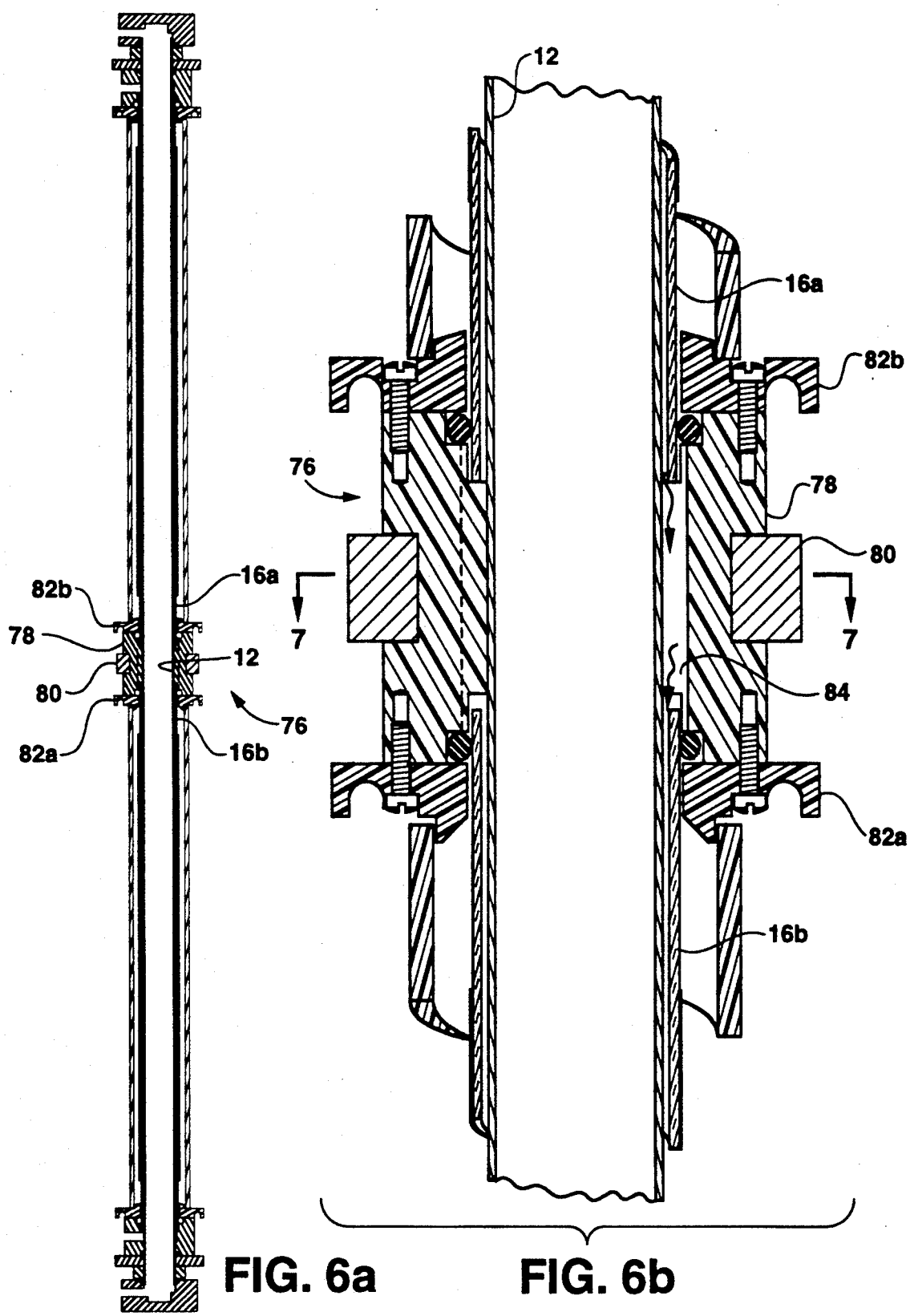
FIG. 6a  FIG. 6b

SELF-CONTAINED TUBULAR CORONA CELL FOR GENERATING OZONE

BACKGROUND OF THE INVENTION

1. Field of the Invention

This invention relates generally to devices which generate ozone by applying a high voltage alternating current across a gap to create a corona discharge, and more specifically to an ozone generator cell of the elongate concentric tube type which has an annular corona gap bounded by two surfaces at least one of which is a dielectric, and which is functional as an individual self-contained cell.

2. Description of the Prior Art

Ozone is a very powerful gaseous reactant, and its use has been well established for many years in a wide range of industrial applications. Recently its value in all types of water purification applications has been coming to the fore because of its ability to act as a powerful oxidant, microflocculant and disinfectant without producing toxic by-products.

The most widely used method of generating ozone is to flow dry air or oxygen through a narrow gap or annulus bordered on one side by a cooled stainless steel ground electrode and on the other by a dielectric electrode surfaced (on the side which faces away from the gap) with an electrical conductor. An alternating current of high voltage is connected to the dielectric electrode, producing a high voltage field across the gap which results in a corona discharge. This discharge, which is also known as a "silent discharge" or "cold plasma discharge" and is actually composed of many transient microdischarges, converts a percentage of the gas to ozone. The dielectric is necessary to prevent the microdischarges from becoming arcs, which would rapidly destroy the electrode surfaces.

The majority of high quality prior art corona ozone generators have been designed for very large-scale industrial-type applications, with dozens of glass tubes in a large boiler-like stainless vessel. Today there is a great need in numerous water treatment applications for high quality small and medium-sized individual (stand-alone) cells which are reasonable in cost and which can be maintained by people who do not have extensive training. Much of the prior art that has addressed this need has simply scaled down previous large-scale designs, and because they still retain many of the original design features require precision welding of stainless steel, are extremely expensive and are difficult to assemble and service. The less expensive prior art designs often do not maintain an accurate corona gap, the result being a decreased ozone production. In addition, most prior art designs for small individual cells have elastomeric seals which put pressure on either the inner wall or the butt ends of the dielectric tube, which are a tube's weak points, and this occasionally leads to breakage. Furthermore, the elastomeric material used for the seals in most prior art is slowly degraded by ozone. Also, prior art designs generally use only one seal between a cooling liquid and the corona cavity, which sometimes results in a gradual contamination of the corona cavity by coolant when temperature or pressure changes cause the seal to roll or "pump" slightly back and forth.

SUMMARY OF THE INVENTION

The present invention has been designed expressly as an individual self-contained and self-supporting tubular cell for the generation of ozone via corona discharge. It consists basically of two open-ended straight tubes. An inner metal tube serves as a first electrode and is cooled by a fluid flowing through its core. An outer tube, which concentrically surrounds and is shorter than the inner tube, is a glass or ceramic dielectric tube carrying a second electrode in the form of an electrically conductive layer on a portion of the length of its outer surface. This outer tube is cooled by a flow of fluid across its outer surface. The outer surface of the metal tube and the inner surface of the dielectric tube define a thin annular gap (of generally between 0.8 and 1.6 millimeters) through which dry air or oxygen flows. When an AC high-voltage is applied across the first and second electrodes, a corona discharge occurs in the annular gap which converts a portion of the oxygen to ozone.

The metal tube also serves as a supporting column on which all the other components of the cell are either directly or indirectly mounted, and simultaneously serves as the reference to which all the components are aligned. The cell is assembled on and supported by the inner metal tube, which carries a collar near each of its ends. Across each collar are clamped outer end-pieces or end-caps carrying coolant sealing rings and coolant inlet/outlet ports, the inner side of the clamp assembly comprising flat aligning clamping-plates. Short cylinders or support cylinders of ozone-inert and preferably non-electrically conductive material, bearing gas inlet-/ozone outlet ports and also carrying seals within internal grooves machined or moulded concentrically into each face, fit concentrically around the metal tube and are clamped between the inner surfaces of the aligning clamping-plates (which serve to align the short cylinders perpendicular to the metal tube and to seal the short cylinders to the tube by an O-ring means which delineates the ends of the corona chamber) and the outer surfaces of seal-retaining clamping-plates. Sealing rings form a seal around the outside diameter of the dielectric tube a short distance from the end of each tube. These dielectric tube sealing rings, which are comprised of either an ozone-resistant elastomer or of an ozone-inert plastic energized by an elastomer or spring, in addition to their sealing function also serve to suspend and align the dielectric tube concentrically around the inner metal tube, since the short cylinders which carry the sealing rings are clamped in perpendicular and concentric alignment with the metal tube. Therefore this "free-floating" suspension simultaneously provides a symmetrical corona gap, a necessary electrical isolation of the dielectric tube from the metal tube, protects the dielectric from mechanical vibration and shock, and allows the dielectric tube to cycle freely through both longitudinal and lateral thermal expansion and contraction without stress, strain or seal leakage. The sealing pressure of the rings is only inward against the outside diameter of the dielectric tube, which is by far the strongest surface of the tube. This contrasts to prior art in which sealing pressure is either outward against the inner diameter, the weakest surface, or pressing longitudinally against the very ends of the tube, which makes one wince when visualizing the resulting longitudinal stress on this glass or ceramic tube, especially when thermal expansion of this tube is also considered.

Uniformity of the thickness of the annular gap is important in order to maximize ozone generation efficiency. This uniformity is dependent on how concentrically the tubes are aligned with each other. The inherent design of the present invention, with the sealing grooves for each tube machined or moulded concentrically into opposite faces of the same short cylinder, automatically insures concentric alignment.

Additional features of the present invention are: the only components that are exposed to corona are the metal (preferably stainless steel or aluminum) tube and the dielectric (glass or ceramic) tube; the design enables the use of completely ozone-inert materials for all components exposed to ozone including the seals, which allows this cell to be used in ultra-pure and drinking water applications with complete safety (without fear of trace amounts of unknown products of the reaction of ozone with the seal material), and which also greatly reduces maintenance; the cooling cavity and the corona cavity have separate seals with an air space between them, insuring that the corona cavity cannot become contaminated with coolant fluid; there is a very long and discontinuous electrical path between the electrodes, minimizing any possibility of parasitic arcing; both electrodes can be actively cooled, which maximizes ozone output and ozone generation efficiency; the component parts are easy to manufacture, reasonable in cost, simple to assemble and are self-aligning; the individual corona cell is self-contained, which enables the use of any number of individual cells in either parallel or in series (air/ozone flow) for flexibility of output capacity, for redundancy and for ease in trouble-shooting and replacement; the corona cell is suitable for use in both negative and positive (up to at least 30 psi) pressure applications and for use with both low and high frequency power supplies; and this cell was designed to be as reliable and as maintenance-free as possible.

The present invention also includes an extension coupling, which is the functional equivalent of two of the short cylinders fused back-to-back and serves to allow the mounting of two or more dielectric tubes in series on a single metal tube.

BRIEF DESCRIPTION OF THE DRAWINGS

FIG. 2a includes a central filler-rod; and

FIG. 2b illustrates a central heat-exchanging tube;

FIG. 6a is a side elevation cross-sectional view of two dielectric tubes coupled together on a single metal tube by an extension coupling;

FIG. 6b is an enlarged view of the extension coupling;

DETAILED DESCRIPTION OF A PREFERRED EMBODIMENT

Definitions: "inner and outer" when mentioned in relation to the flat faces of components, refer respectively to a medial surface facing in the longitudinal direction towards the center of the cell, and to a distal surface facing in the longitudinal direction towards the outer ends of the cell.

Figure 1A:
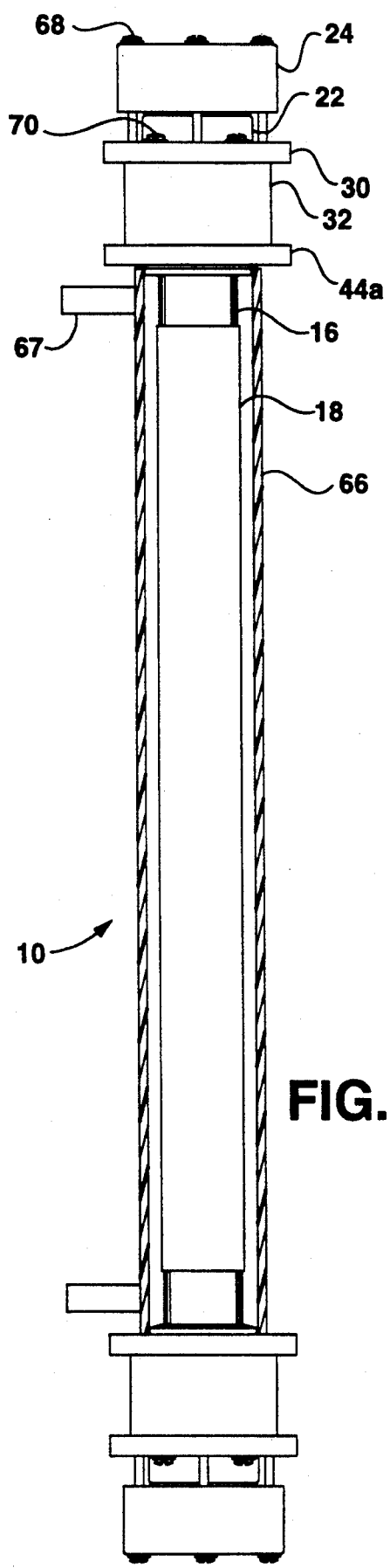
FIG. 1a is a side elevation view of a preferred embodiment of the self-contained tubular corona cell of the present invention.
Figure 1B:
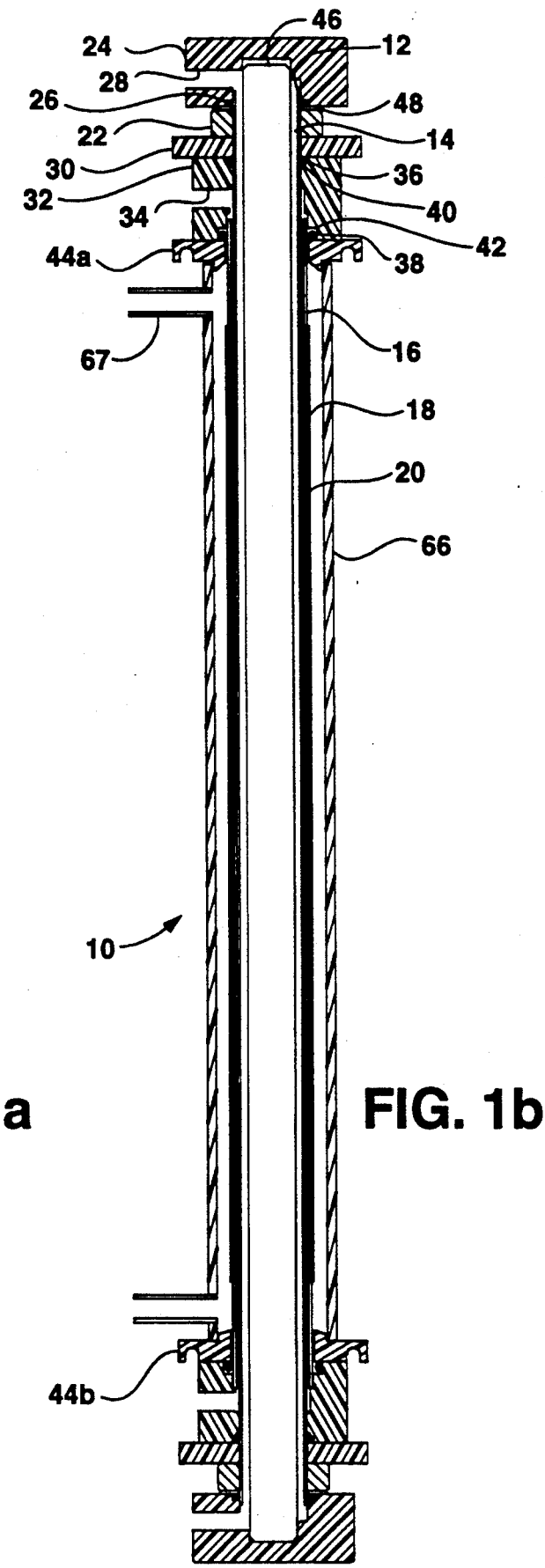
FIG. 1b is a side elevation cross-sectional view of this same cell.
Figure 2A:
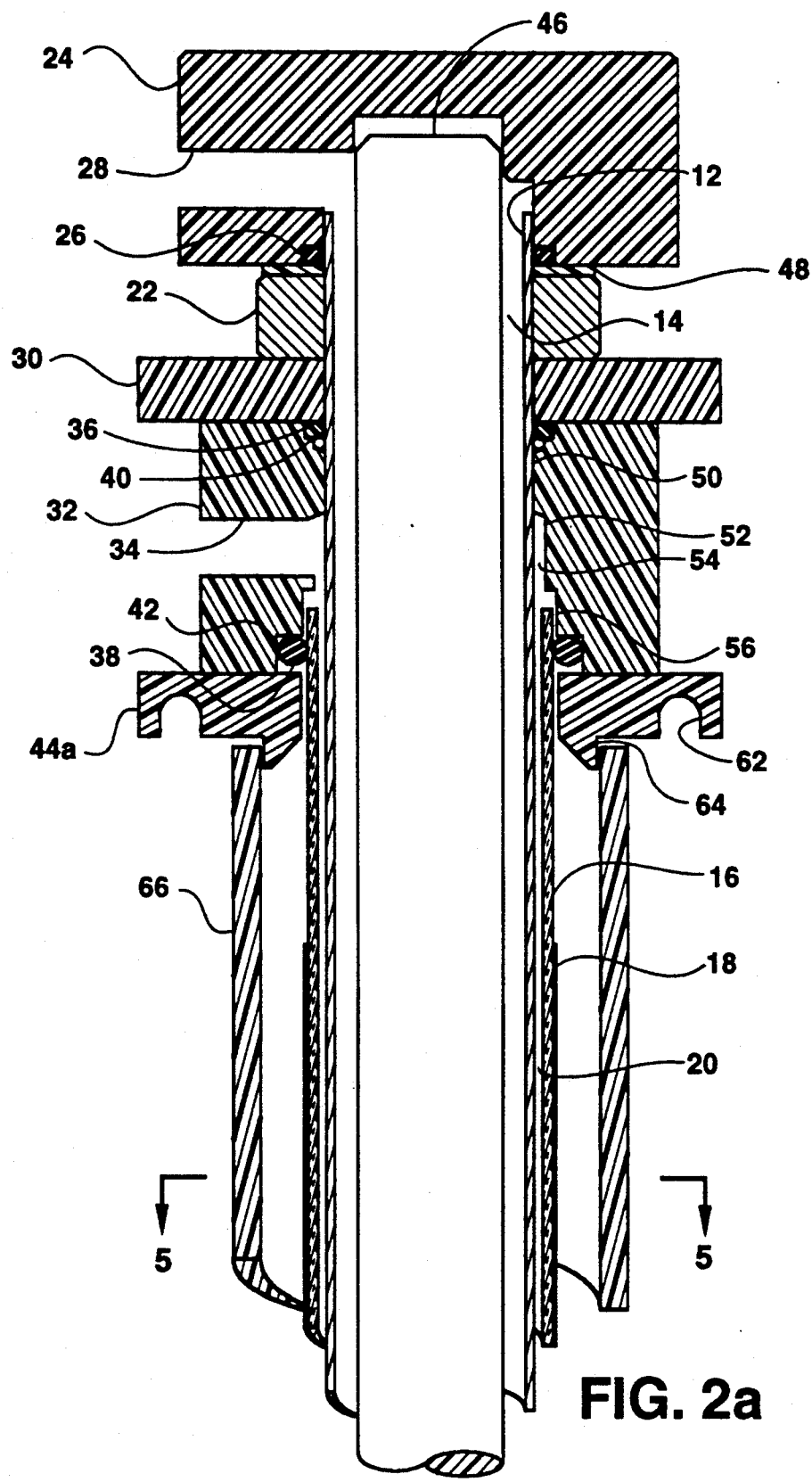
FIGS. 2a and 2b are enlarged side elevation cross-sectional views of the upper portion of the cell.
Figure 2B:
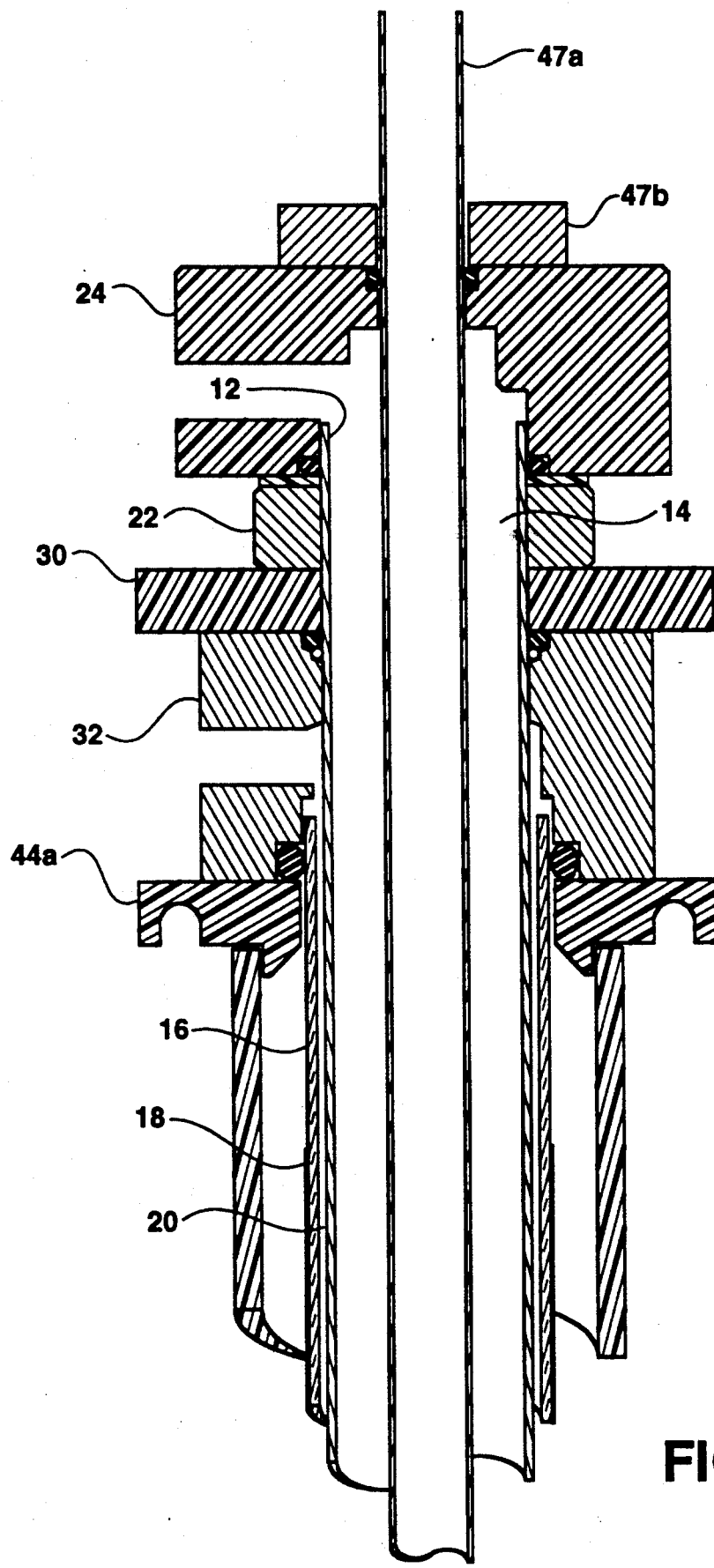

FIG. 1a is a side elevation view of a preferred embodiment of the self-contained tubular corona cell 10 of the present invention, FIG. 1b is a side elevation cross-sectional view of this same cell, and FIG. 2a and 2b are enlarged side elevation cross-sectional views of the upper portion of the cell. The cell consists basically of two open-ended straight-walled tubes (of generally uniform diameter). An inner metal tube 12 serves as a first electrode and is cooled by a fluid flowing through its core 14. An outer tube 16, which concentrically surrounds and is shorter than the inner tube, is a glass or ceramic dielectric tube carrying a second electrode in the form of an electrically conductive layer 18 on a portion of the length of its outer surface. This outer tube is cooled by a flow of fluid across its outer surface. The outer surface of the metal tube and the inner surface of the dielectric tube define a thin annular gap 20 (of generally between 0.8 and 1.6 millimeters) through which dry air or oxygen flows. When an AC high-voltage is applied across the first and second electrodes, a corona discharge occurs in the annular gap, converting a portion of the oxygen to ozone.

The metal tube also serves as a supporting column on which all the other components of the cell are either directly or indirectly mounted, and simultaneously serves as the reference to which all the components are aligned. The cell is assembled on and supported by the inner metal tube 12, which carries collars 22 near each of its ends. Across each collar are clamped outer end-caps or end-pieces 24 carrying coolant sealing rings 26 and coolant inlet/outlet ports 28, the inner side of the clamp assembly comprising flat aligning clamping-plates 30. Short cylinders or support cylinders 32 of ozone-inert non-electrically conductive material, bearing gas inlet/ozone outlet ports 34 and also carrying seals 36, 38 within internal grooves 40, 42 machined or moulded concentrically into each face, fit concentrically around the metal tube. These short cylinders 32 are clamped between the inner surfaces of the aligning clamping-plates 30 (which serve to align the short cylinders perpendicular to the metal tube 12 and to seal the short cylinders to the tube by an O-ring means which delineates the ends of the corona chamber) and the outer surfaces of seal-retaining clamping-plates 44. Sealing rings 38 form a seal around the outside diameter of the dielectric tube 16 a short distance from the end of each tube. These dielectric tube sealing rings, which are comprised of either an ozone-resistant elastomer or of an ozone-inert plastic energized by an elastomer or spring, in addition to their sealing function, also serve to suspend and align the dielectric tube 16 concentrically around the inner metal tube 12, since the short cylinders 32 which carry the sealing rings are clamped in perpendicular and concentric alignment with the metal tube.

Thus the metal tube 12 serves simultaneously as a first electrode, as a supporting column on which all other components are either directly or indirectly mounted, and as the reference to which all components are aligned. It can be either liquid or air cooled, with an optional solid or plugged filler-rod 46 running through its center to reduce the internal volume and thus provide a rapid thin sheet flow of coolant for more effective heat exchange. In addition, the filler-rod can include grooves or projections capable of inducing spiral or turbulent flow. Projections can also serve to keep the rod centered in the metal tube. In place of filler-rod 46, an innermost heat-exchanging tube 47a, illustrated in FIG. 2b, can be positioned in the center of metal tube 12 with its ends exiting from the end-pieces 24 via sealing fittings 47b. This innermost heat-exchanging tube can thus serve the dual purpose of reducing internal volume and also to either cool a flow of air before it is ozonated, or to cool a flow of ozone, or to provide a flow of a cooled second coolant, for example, a non-conductive coolant to be used to cool the outside of the dielectric tube. The metal tube 12 can have internal fins or other surface-area increasing means, especially if it is to be cooled by a flow of air.

The collar 22 is preferably a metal clamp-type shaft collar which in the present invention serves simultaneously to anchor and to align the end-piece/cylinder/-clamping-plate assemblies at each end of the metal tube 12, and to serve as a strong attachment point for a wire in order to make reliable electrical contact with the metal tube. It is of a type (commonly available as a stock item) which has at least one face (perpendicular to the tube axis, and mounted to face "inward") which is accurately perpendicular to the axis of its through-hole. The thin collar-washer 48 serves to provide a smooth face for the coolant seal 26 of the end-piece 24 to seal against, and is necessary when the horizontal surface of the collar has a slit in it, as in the preferred embodiment.

The aligning clamping-plate 30 simultaneously serves to provide threaded holes for screws which clamp the end-piece 24 against the collar 22, to increase the effective diameter of the collar's aligning inner surface so as to match the diameter of and to align and affix the outer face of the short cylinder 32 accurately perpendicular to the metal tube 12, and to provide a smooth face for the end-of-corona-cavity seal 36 in the groove in the outer face of the short cylinder to seal against.

The short cylinder 32, which is machined or moulded preferably of a completely ozone-inert material such as a ceramic or a fluorocarbon (e.g. Teflon) or mineral-filled fluorocarbon, has in its outer face groove(s) 40 for the end-of-corona-cavity seal 36. In the preferred embodiment, 40 comprises a double groove, an outer groove of larger outside diameter for a reasonably ozone-resistant (e.g. silicone) elastomeric O-ring, and an inner groove of smaller outside diameter for a completely ozone-inert (Teflon) plastic O-ring of smaller cross-sectional diameter than the outer O-ring. The thicker O-ring does not contact ozone, but it serves as a back-up seal and as an elastomeric energizer to continuously press the Teflon O-ring against both the groove and the metal tube. An elastic energizer is necessary since Teflon itself is not very elastic. The above arrangement is necessary to provide that only completely ozone-inert material is exposed to ozone because at the present time the only elastomeric material that is completely ozone-resistant is so expensive that it would double the parts cost of the entire cell.

The smallest inside bore 50 of the short cylinder is a close sliding-fit to the metal tube, and the next bore step 52 inward provides a gas passage 54 and is smaller than the outside diameter of the dielectric tube 16 so that it also acts as an end-stop for the tube (the distance between the collars on the metal tube is selected such that the space between the two dielectric tube end-stops is approximately one-sixteenth of an inch longer than the dielectric tube). The gas passage 54, being of somewhat larger diameter than the annular corona gap 20, serves to conduct and distribute the gas circumferentially as it enters and leaves the corona gap, thereby maximizing the homogeneity of the flow rate throughout the gap. This effect can be optionally increased if desired by widening the gas passage with an internal groove. The next bore step 56 is large enough so that there is some space between it and the dielectric tube and serves as one retaining edge for the dielectric tube sealing ring, and the last bore step 42 provides the internal groove(s) for the dielectric tube sealing ring. The groove(s) in the inner face of the short cylinder can either contain the same combination of O-rings as used in the seal on its other face, or a spring-energized fluorocarbon (Teflon) O-ring. The latter is used in the preferred embodiment because it seals with less pressure on the dielectric tube, and allows the dielectric tube to "float" freely (it can be rotated, or it can be moved up and down approximately one-sixteenth of an inch by hand) without strain, while maintaining concentricity. The self-aligning design of the present invention is particularly forgiving of slight dimensional tolerance deviations in the diameters of both the metal and dielectric tubes.

The seal-retaining clamping-plate 44a, 44b simultaneously retains the dielectric tube seal, provides threaded holes for screws which clamp the short cylinder 32 against the aligning clamping-plate 30, provides a drip-ring 62 (which protects from any condensation drip) lengthens the electrical path between the electrodes to diminish the possibility of parasitic arcs, and provides a smaller, air-jacket-aligning drip-ring 64 which acts to hold and concentrically align an optional forced-air-cooling jacket 66. Optionally, an additional groove in the inner face of the seal-retaining clamping-plate may be used to provide a space between plate 44 and the dielectric tube 16 which can be filled with a sealant such as flexible silicone adhesive to serve as a back-up seal. The air-cooling jacket also serves as a protection sleeve to enclose the high-voltage surface and protect the dielectric tube. The upper and lower portions of the cell are generally identical, with the exception of the (optional) differences in the drip rings in the upper and lower seal-retaining clamping-plates 44a and 44b. The air-cooling jacket 66 may be a tube of electrically insulating material such as plastic which bears air inlet/outlet ports 67 and a feed-through for a high-voltage connection to the electrically conductive layer. The jacket may be slit lengthwise into two halves and rejoined at one cut edge by a hinge of flexible adhesive/sealant such as RTV silicone.

Additional explanation of the principles of this invention is provided by a description of the assembly procedure, which is as follows:

1) All components of the first end assembly are loosely assembled on the metal tube 12.

Figure 3:
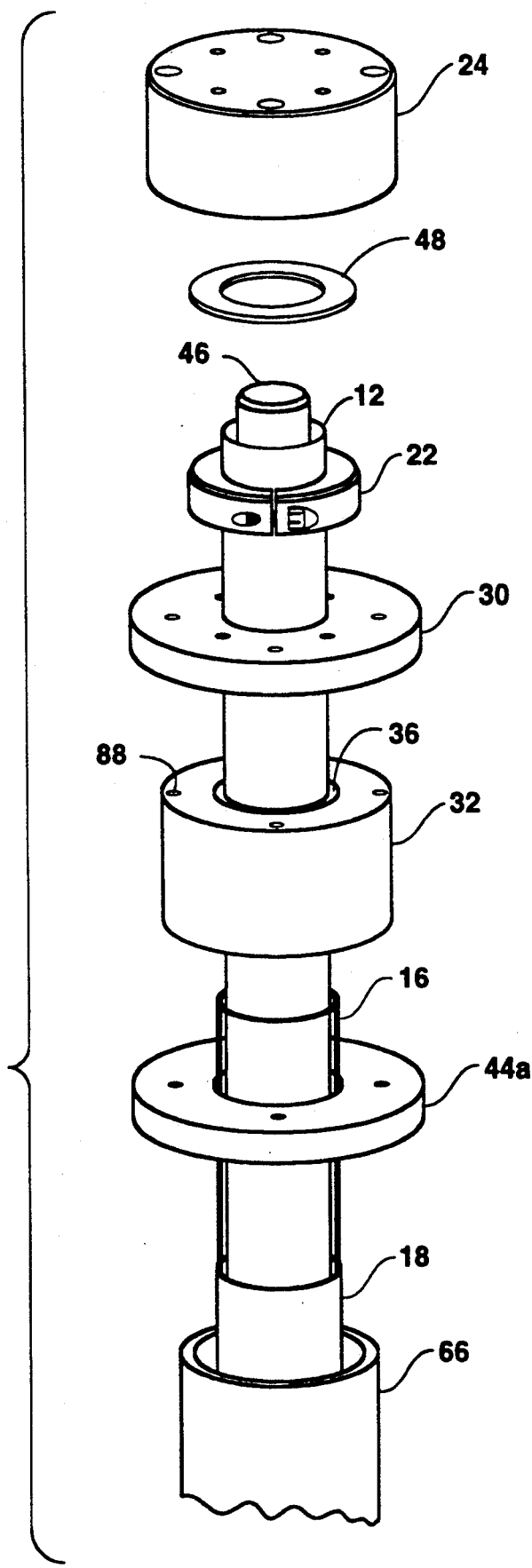
FIG. 3 is an exploded perspective view of the cell components being assembled on the upper end of the inner metal

2) A collar 22 is clamped firmly onto the metal tube at a measured distance from the first end. FIG. 3, an exploded perspective view of the cell components, illustrates this phase of assembly.

Figure 4:
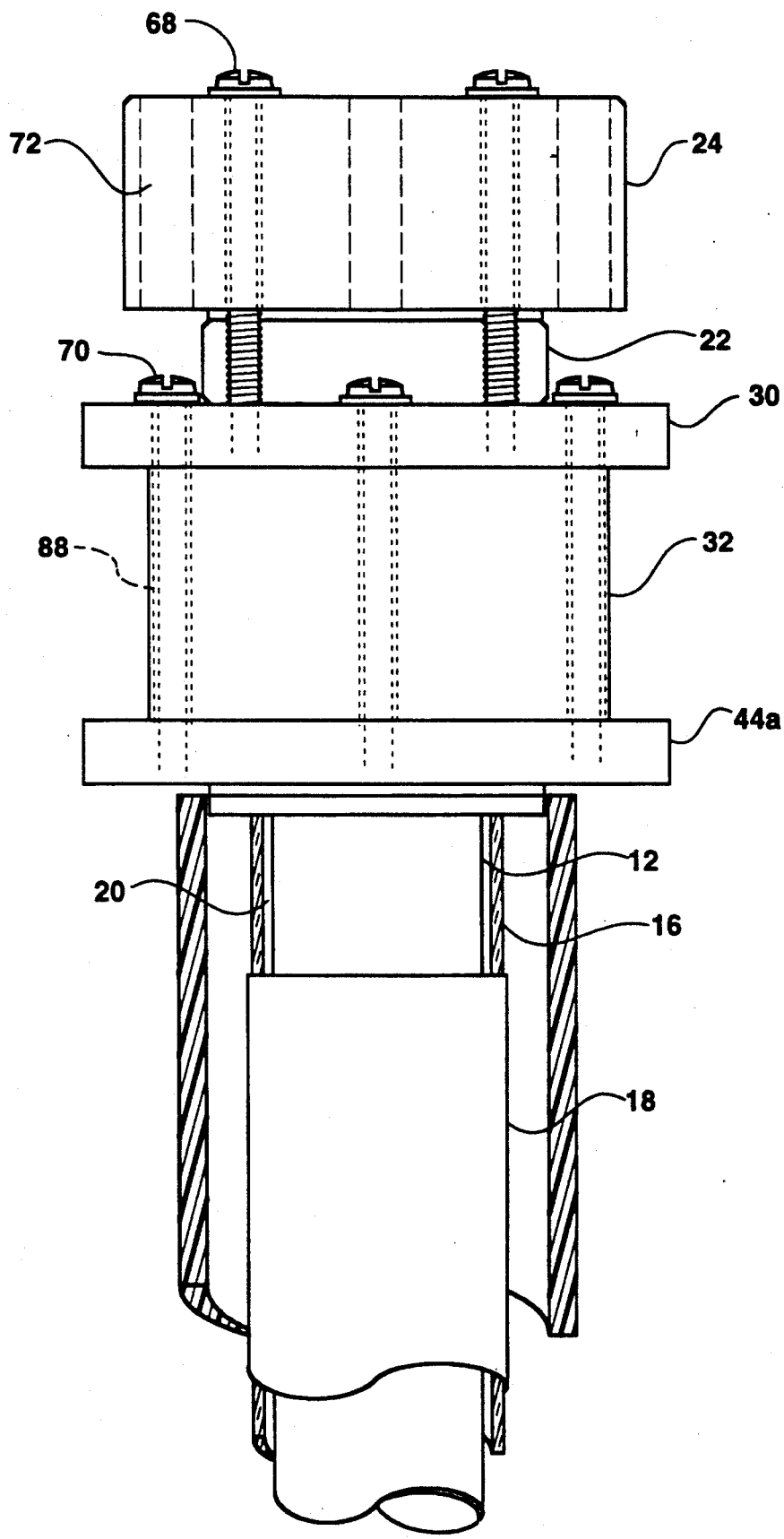
FIG. 4 is a side elevation view of the cell.

3) Four screws 68 on the outer side of end-piece 24 as shown in FIG. 4 (a side elevation view of the upper portion of the cell) are tightened so as to clamp the end-piece 24 (with its coolant seal and collar-washer) and the aligning clamping-plate 30 firmly on either side of the collar 22, causing the aligning clamping-plate to become perpendicularly aligned to the metal tube. Thus the end-piece, collar and aligning clamping-plate comprise a clamping assembly.

4) Four screws 70 on the outer side of aligning clamping-plate 30 are tightened by inserting a screwdriver through screwdriver clearance-holes 72 (see FIG. 4) in the end-piece 24, thus aligning and clamping the short cylinder 32 between the aligning clamping-plate 30 and the seal-retaining clamping plate 44. The aligning clamping-plate, short cylinder and seal-retaining clamping plate comprise a corona gap aligning assembly.

5) Steps 1-4 are repeated for the second end assembly.

6) If an air jacket is to be employed, it is installed by folding its two hinged halves closed around the air-jacket-aligning drip rings 64.

In the preferred embodiment of this invention, the metal tube serves as a ground electrode, being grounded through a wire attached to one of the metal collars (or, for extra safety and reliability, to both collars). An electrically conductive layer or surface formed by any means on the outer surface of the dielectric tube serves as the high-voltage electrode. The boundaries at the outer edges of this conductive layer may be coated with a material such as RTV silicone to prevent parasitic arcing. An additional feature of the present invention is that some pre-cooling of the oxygen occurs while it travels along the cooled metal tube for a short distance before it reaches the corona at the boundary of the conductive layer.

Figure 5:
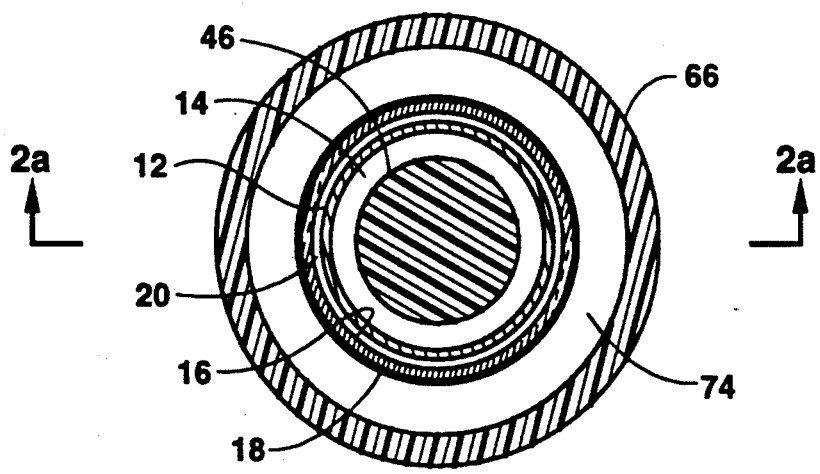
FIG. 5 is a horizontal cross-sectional view of a middle portion of the cell.

FIG. 5 is a horizontal cross-sectional view of a middle portion of the cell. This view better illustrates the spatial relationship of the concentric components, including filler rod 46, annular first electrode cooling channel 14, metal tube (first electrode) 12, corona gap 20, dielectric tube 16, electrically conductive layer (second electrode) 18, annular outer cooling channel 74 and outer cooling jacket 66.

FIGS. 6a and 6b are side elevation cross-sectional views of two dielectric tubes 16a and 16b coupled together on a single metal tube 12 by an extension coupling 76. This variation of the above described corona cell employs one or more extension couplings to couple together two or more dielectric tubes (which can be of the same length as used in the above described cell) in series on a single long metal tube. For example, two dielectric tubes coupled together provide the same ozone generating capacity as two individual cells but eliminate two end assemblies and reduce the number of inlet and outlet fittings and hoses by one-half. Extension coupling 76 may include a coupling cylinder 78, a clamping collar 80, and dielectric tube seal-retaining means 82a, 82b.

Figure 7:
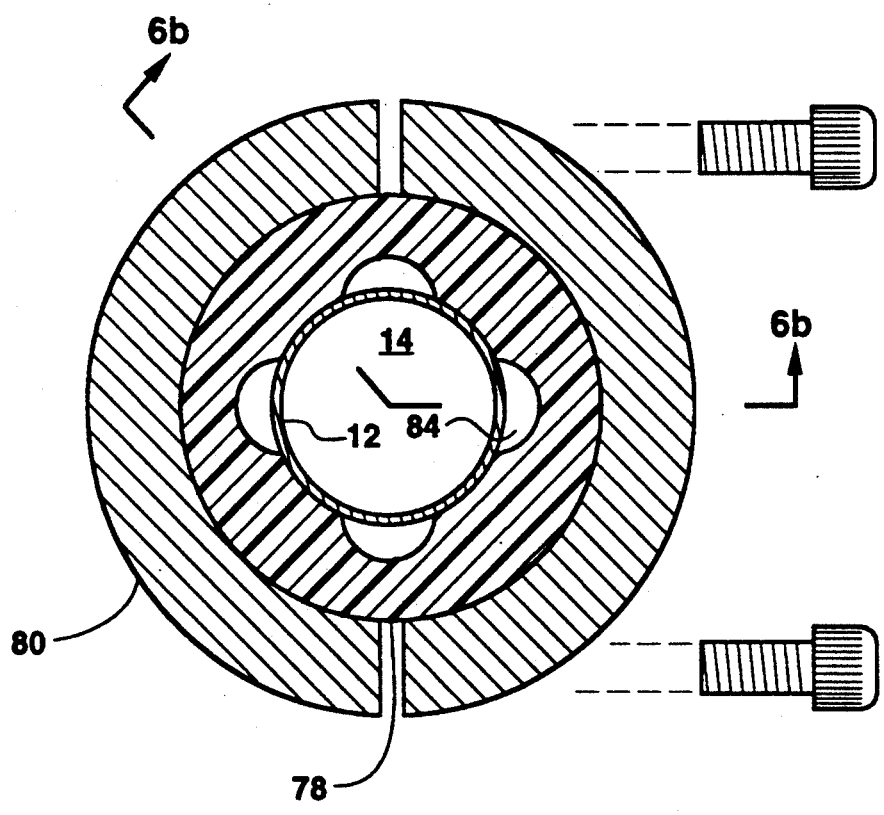
FIG. 7 is a horizontal cross-sectional view of the extension coupling.

FIG. 7 is a horizontal cross-sectional view of the embodiment of the extension coupling illustrated in FIG. 6b. The flow of ozone is conducted through the coupling via holes or grooves 84 spaced around (and optionally, for interim cooling, in contact with) the metal tube. The extension coupling is firmly affixed and aligned to the metal tube by tightening the spilt-ring clamping collar 80. This clamping means is effective because of the already close tolerances and because the coupling is to be manufactured of a material which has some flexibility. Optionally a strip of thin elastomeric sheet may be included on the underside of the collar.

The useful length of a dielectric tube is limited by its lack of perfect straightness. It is easier and less expensive to manufacture two medium length straight tubes than one longer one. Furthermore, accurate concentricity of annular gap 20 is more tolerant of curvature in both the dielectric tube and in the longer metal tube when the dielectric tube is relatively short. In addition to providing a more uniform corona gap, shorter dielectric tubes are stronger, more shock resistant and easier to apply a conductive layer to. Therefore extension couplings allow the use of a number of dielectric tubes in series on a single metal tube, like elongated beads threaded on a string, saving space and decreasing the total number of parts required. The number of dielectric tubes that can be used on a single metal tube is limited only by the flow rate and temperature of the cooling fluid.

Figure 8:
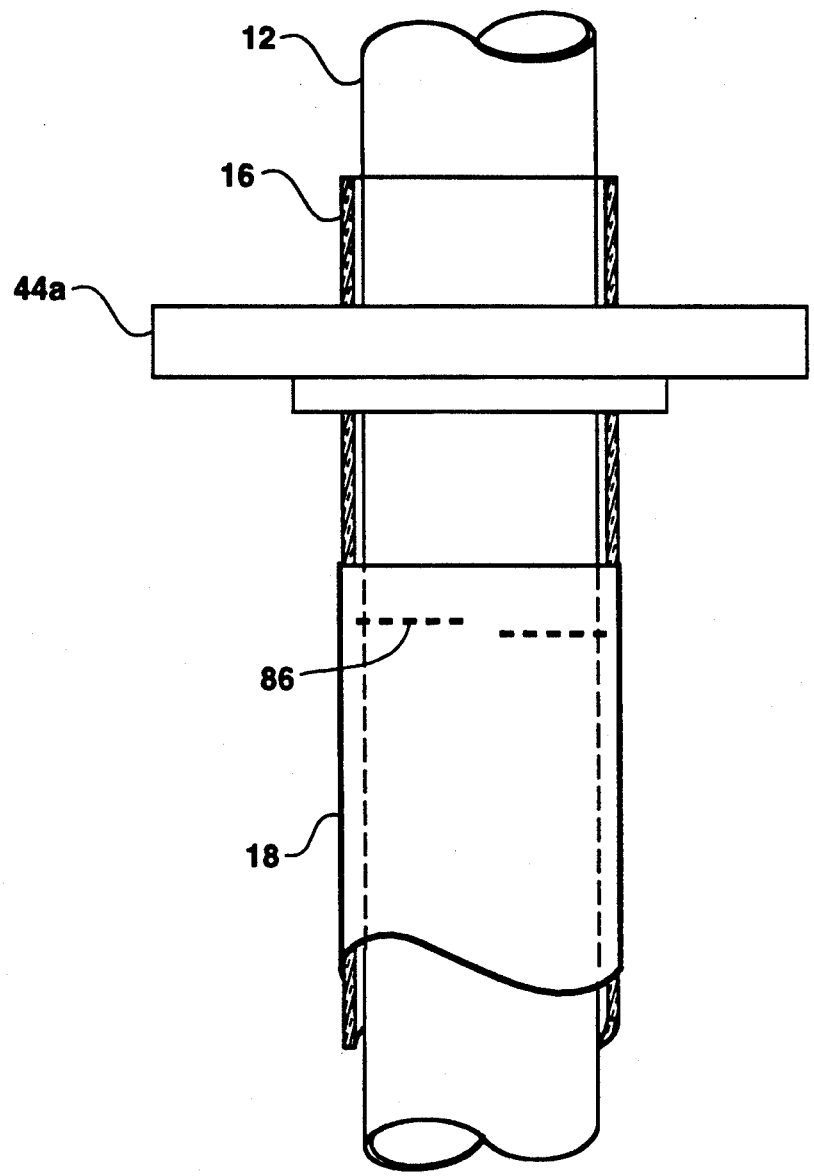
FIG. 8 is a side elevation view of a corona starter ring as installed on the metal tube.

FIG. 8 is a side elevation view of a corona starter ring as installed on the metal tube. In especially cold environments and/or when periods between usage are very long, this optional corona starter ring may be incorporated into the cell order to insure reliable initial corona ignition upon turn-on, thus eliminating any need for an initial overvoltage or special starting circuit. This corona starter member can be embodied as a shallow circumferential groove cut into the surface of the metal tube, or preferably as a coil 86 of more than one-half turn of thin spring-wire wrapped around the metal tube and held by its own spring tension. In either case, the location of the starter ring should be inside but near the level of the boundary of the conductive layer at the end of the corona cavity from which the dry air or oxygen is flowing, i.e., where the air first enters the corona. The surface of the starter ring, because of its small radius of curvature, experiences a much higher voltage field than does the metal tube, and thus serves as a source of ions to induce corona ignition downstream from itself at a lower voltage than corona ignition would otherwise require. It is not beneficial to cover more than a small fraction of the metal tube in this fashion because although this would enable stable corona operation at a lower voltage, the concentration of ozone would be diminished at all voltages because the "hot spots" created by the wires (or ridges or grooves) tend to destroy ozone once it is above a certain concentration. The small hot-spot on the metal tube that occurs with the starter ring shown has no effect on ozone concentration because it is placed at the beginning of the corona cavity where the ozone concentration is yet very low.

Alternate Options

The coolant inlet/outlet ports in the end-pieces can be either horizontal and perpendicular to the outside diameter of the end-piece, or horizontal and offset to the side (to swirl the coolant flow), or vertical down through the center. Where the metal tube is to be air cooled, one or both end-caps together with their seal and their collar-washers can optionally be replaced by simple clamping ring end-pieces. Wider collars with screw-holes and an inner collar-washer could be substituted for the aligning clamping-plates. With air-cooling of the metal tube plus wider collars, neither end-pieces nor aligning clamping-plates would be needed. But since active cooling of both electrodes, especially if at least one of the coolants is a liquid, makes possible a higher concentration and a greater total output of ozone, an end-piece type of embodiment is preferred. Any type of collar or clamping means may be substituted for collar 22, including an end-piece or short cylinder configured to clamp directly onto the metal tube, or a threaded end-piece which is screwed onto a threaded metal tube.

The dry gas inlet/ozone outlet holes in the short cylinders can be either perpendicular to the outside diameter of the cylinder, or offset to the side in order to swirl the gas flow. The extension coupling 68 can optionally have a (horizontal) gas inlet or outlet.

The set of screws 70 could be eliminated by using longer screws in the place of screw set 68, in which case the set of longer screws could clamp the entire end assembly together. Instead of the vertical screw-clearance through-holes 88 shown drilled through the short cylinders in FIGS. 3 and 4, grooves could be substituted, or the screws could lie along the outside diameter of the cylinder wall. Alternatively, screws could be threaded into a ring clamped around the outside of the cylinder, or into tapped inserts or holes tapped directly into the body of the cylinders, in which case the seal-retaining clamping-plate could be replaced by any retaining means such as an internal retaining ring. Optionally, a U-shaped face-groove could be employed to carry an energizing elastomer or spring, and the material of the cylinder itself could supply the ozone-inert plastic surface which seals against the dielectric.

The outside diameter of the short cylinder could be banded or could be encased in a rigid shell to provide added dimensional stability. An alternative means of providing a function similar to banding, and/or to provide an additional means of aligning the seal-retaining clamping-plate (which in the preferred embodiment is aligned by the screw clearance holes 88 drilled vertically through the short cylinder), would be for one or both clamping-plates to be thicker than shown and to include a recess in their face, with the inside diameter of the recess being slightly larger than the outside diameter of the short cylinder, thus encasing the cylinder wall in a partial shell with a face of the short cylinder sitting in a close-fitting recessed socket.

The dielectric tube can either be air cooled or liquid cooled, and in lieu of the air-cooling jacket 66, a fluid-cooling jacket whose ends are sealed directly to the dielectric tube may be employed. This method of constructing a fluid-cooling jacket insures that cooling liquid cannot contaminate the corona chamber seals during operation, disassembly, or reassembly. A fluid coolant can be an electrically non-conductive fluid such as oil or deionized water, which could be cooled in turn by flowing it through an innermost heat-exchanging tube 47a which extends through the centers of the end-pieces (FIG. 2b). The jacket cooling circuit can either include a pump or can utilize passive circulation of the fluid due to thermal density changes. Alternatively, the jacket cooling fluid could be an electrically conductive liquid used simultaneously as a coolant and as a substitute for the electrically conductive layer, in which case the innermost heat-exchanging tube could be of an electrically insulating material.

Figure 9:
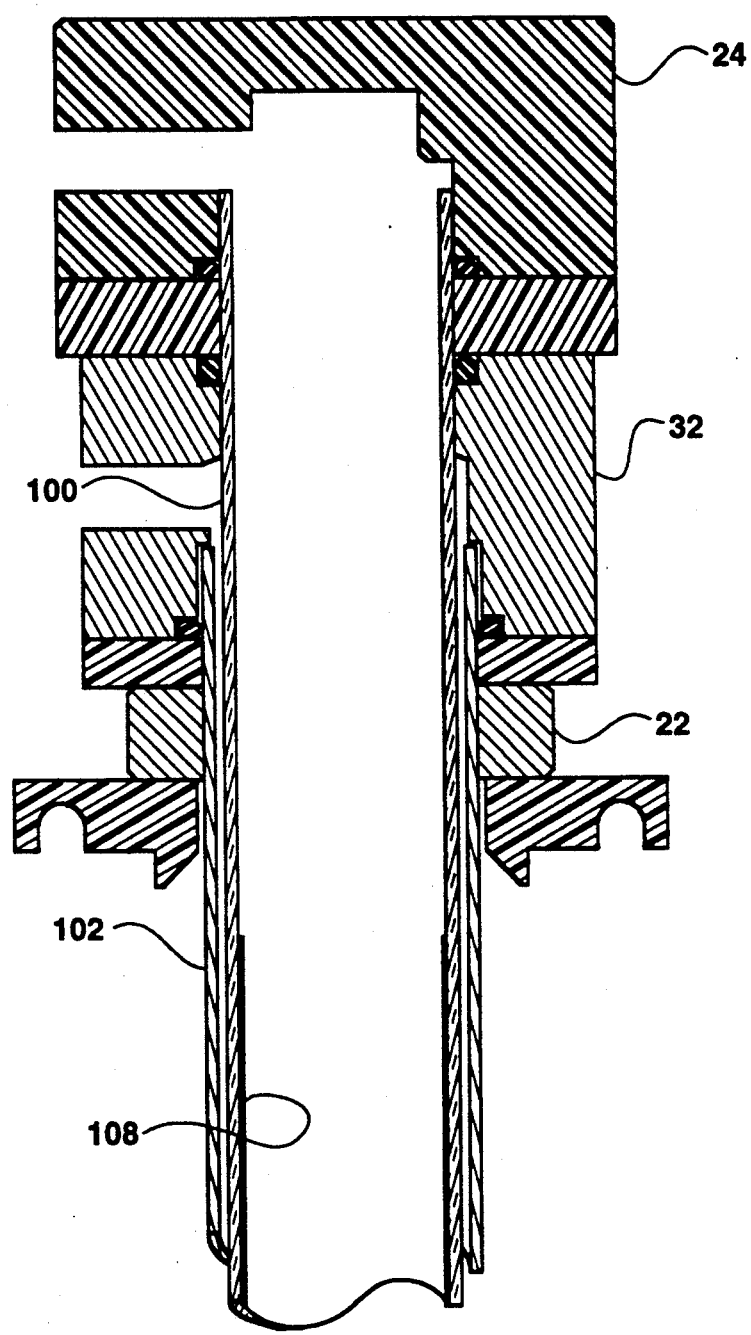
FIG. 9 is a side elevation cross-sectional view of the upper portion of an alternate embodiment of the present invention.

FIG. 9 is a side elevation cross-sectional view of the upper portion of an alternate embodiment of the present invention, where a dielectric tube 100 is a longer inner tube and a metal tube 102 is a shorter outer tube, and where a collar 22 is clamped near the end of the outer metal tube and a short cylinder 32 is mounted on the outer side of the collar. An electrically conductive layer 108 is on the inside of the dielectric tube. Any type of collar or clamping means may be substituted for collar 22, including a short cylinder configured to clamp or thread directly onto the metal tube. End-piece 24 is optional depending on the type of cooling and cooling fitting desired.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A self-contained tubular corona cell for generating ozone, said tubular corona cell comprising:

an inner tube member comprising a conductive electrode having an inside surface, an outside surface, a pair of ends, a longitudinal length, and a generally uniform outside diameter;

an outer tube member comprising a dielectric electrode having an inside surface an outside surface, and bearing a conductive layer over at least a portion of said outside surface, said outer tube member further having a pair of ends, a longitudinal length less than said inner tube member longitudinal length, an inside diameter greater than said inner tube member outside diameter, and an outside diameter;

a pair of support cylinders conditioned to position said outer tube member in concentric arrangement with said inner tube member, one support cylinder carried proximate each end of said inner tube member, each of said support cylinders having a distal surface, a medial surface, and an inside bore; said inside bore including a first section having a diameter generally equal to said inner tube member outside diameter, said inside bore first section positioned proximate said support cylinder distal surface and including sealing means for sealing capture of said inner tube member outside surface; a second section having a diameter generally greater than said inner tube member outside diameter, said inside bore second section positioned between said support cylinder distal surface and said medial surface, said second section including port means for passage of a gas; and a third section having a diameter slightly greater than said outer tube member outside diameter, said inside bore third section positioned proximate said support cylinder medial surface and including sealing means for sealing capture of said outer tube member outside surface, so that said first, second, and third sections of said inside bore support said outer tube member inside surface in alignment with said inner tube member outside surface to define an annular gap, said annular gap being in fluid communication with said support cylinder inside bore second section; and clamping means for removably securing said support cylinders proximate said inner tube member ends, said clamping means comprising a clamping assembly mounted at said inner tube member ends adjacent said support cylinder distal surfaces, said clamping assembly comprising a collar member transversely clamped to said inner tube member, with said support cylinder inside bore first section sealing means comprising a seal member positioned adjacent said collar member, wherein said collar member is isolated from fluid communication with said annular gap and said support cylinder inside bore second section.

2. The tubular corona cell of claim 1 including an aligning plate secured against said collar member.

3. The tubular corona cell of claim 1 including an end-piece bearing port means for passage of a cooling fluid.

4. The tubular corona cell of claim 1 wherein each said first section seal member comprises a pair of adjacent seals.

5. The tubular corona cell of claim 1 including a seal-retaining plate adjacent said support cylinder medial surface, wherein said support cylinder inside bore third section sealing means comprises a seal member positioned adjacent said seal-retaining plate.

6. The tubular corona cell of claim wherein each said third section seal member comprises a pair of adjacent seals.

7. The tubular corona cell of claim 1 including a filler-rod member inserted within said inner tube member.

8. The tubular corona cell of claim 1 including a heat-exchanging tube member inserted within said inner tube member.

9. The tubular corona cell of claim 1 including a cooling jacket installed around said outer tube member outside surface.

10. A self-contained tubular corona cell for generating ozone, said tubular corona cell comprising:
- an inner tube member comprising a conductive electrode having an inside surface, an outside surface, a pair of ends, a longitudinal length, and a generally uniform outside diameter;
- an outer tube member comprising a dielectric electrode having an inside surface an outside surface, and bearing a conductive layer over at least a portion of said outside surface, said outer tube member further having a pair of ends, a longitudinal length less than said inner tube member longitudinal length, an inside diameter greater than said inner tube member outside diameter, and an outside diameter;
- a pair of support cylinders conditioned to position said outer tube member in concentric arrangement with said inner tube member, one support cylinder carried proximate each end of said inner tube member, each of said support cylinders having a distal surface, a medial surface, and an inside bore; said inside bore including a first section having a diameter generally equal to said inner tube member outside diameter, said inside bore first section positioned proximate said support cylinder distal surface and including sealing means for sealing capture of said inner tube member outside surface; a second section having a diameter generally greater than said inner tube member outside diameter, said inside bore second section positioned between said support cylinder distal surface and said medial surface, said second section including port means for passage of a gas; and a third section having a diameter slightly greater than said outer tube member outside diameter, said inside bore third section positioned proximate said support cylinder medial surface and including sealing means for sealing capture of said outer tube member outside surface, so that said first, second, and third sections of said inside bore support said outer tube member inside surface in alignment with said inner tube member outside surface to define an annular gap, said annular gap being in fluid communication with said support cylinder inside bore second section; and
- clamping means for removably securing said support cylinders proximate said inner tube member ends, and
- a corona starter member encircling at least part of said inner tube member.

11. A self-contained tubular corona cell for generating ozone, said tubular corona cell comprising:
- an inner tube member comprising a conductive electrode having an inside surface, an outside surface, a pair of ends, a longitudinal length, and a generally uniform outside diameter;
- an outer tube member comprising a dielectric electrode having an inside surface an outside surface, and bearing a conductive layer over at least a portion of said outside surface, said outer tube member further having a pair of ends, a longitudinal length less than said inner tube member longitudinal length, an inside diameter greater than said inner tube member outside diameter, and an outside diameter;
- a pair of support cylinders conditioned to position said outer tube member in concentric arrangement with said inner tube member, one support cylinder carried proximate each end of said inner tube member, each of said support cylinders having a distal surface, a medial surface, and an inside bore; said inside bore including a first section having a diameter generally equal to said inner tube member outside diameter, said inside bore first section positioned proximate said support cylinder distal surface and including sealing means for sealing capture of said inner tube member outside surface; a second section having a diameter generally greater than said inner tube member outside diameter, said inside bore second section positioned between said support cylinder distal surface and said medial surface, said second section including port means for passage of a gas; and a third section having a diameter slightly greater than said outer tube member outside diameter, said inside bore third section positioned proximate said support cylinder medial surface and including sealing means for sealing capture of said outer tube member outside surface, so that said first, second, and third sections of said inside bore support said outer tube member inside surface in alignment with said inner tube member outside surface to define an annular gap, said annular gap being in fluid communication with said support cylinder inside bore second section; and
- clamping means for removably securing said support cylinders proximate said inner tube member ends; and
- at least two outer tube members longitudinally joined by an extension coupling member, said extension coupling member attached to said inner tube member outside surface.

12. A self-contained tubular corona cell for generating ozone, said tubular corona cell comprising:
- an inner tube member comprising a conductive electrode having an inside surface, an outside surface, a pair of ends, a longitudinal length, an inside diameter, and an outside diameter;
- an outer tube member comprising a dielectric electrode having an inside surface an outside surface, and bearing a conductive layer over at least a portion of said inside surface, said inner tube member further having a pair of ends, a longitudinal length greater than said outer tube member longitudinal length, and a generally uniform outside diameter less than said outer tube member inside diameter;

a pair of support cylinders conditioned to position said inner tube member in concentric arrangement with said outer tube member, one support cylinder carried proximate each end of said outer tube member, each of said support cylinders having a distal surface, a medial surface, and an inside bore; said inside bore including a first section having a diameter generally equal to said outer tube member outside diameter, said inside bore first section positioned proximate said support cylinder medial surface and including sealing means for sealing capture of said outer tube member outside surface; a second section having a diameter generally greater than said inner tube member outside diameter, said inside bore second section positioned between said support cylinder distal surface and said medial surface, said second section including port means for passage of a gas; and a third section having a diameter slightly greater than said inner tube member outside diameter, said inside bore third section positioned proximate said support cylinder distal surface and including sealing means for sealing capture of said inner tube member outside surface, so that said first, second, and third sections of said inside bore support said inner tube member outside surface in alignment with said outer tube member inside surface to define an annular gap, said annular gap being in fluid communication with said support cylinder inside bore second section; and clamping means for removably securing said support cylinders proximate said outer tube member ends, said clamping means comprising a clamping assembly mounted proximate said outer tube member ends adjacent said support cylinder medial surfaces, said clamping assembly including a collar member transversely clamped to said outer tube member, said support cylinder inside bore first section sealing means comprising a seal member positioned adjacent said collar member, wherein said collar member is isolated from fluid communication with said annular gap and said support cylinder inside bore second section.

* * * * *